March 5, 1940. W. F. GROENE ET AL 2,192,436
CENTER DRIVE DOUBLE END TURRET LATHE
Filed Sept. 27, 1937 16 Sheets-Sheet 3
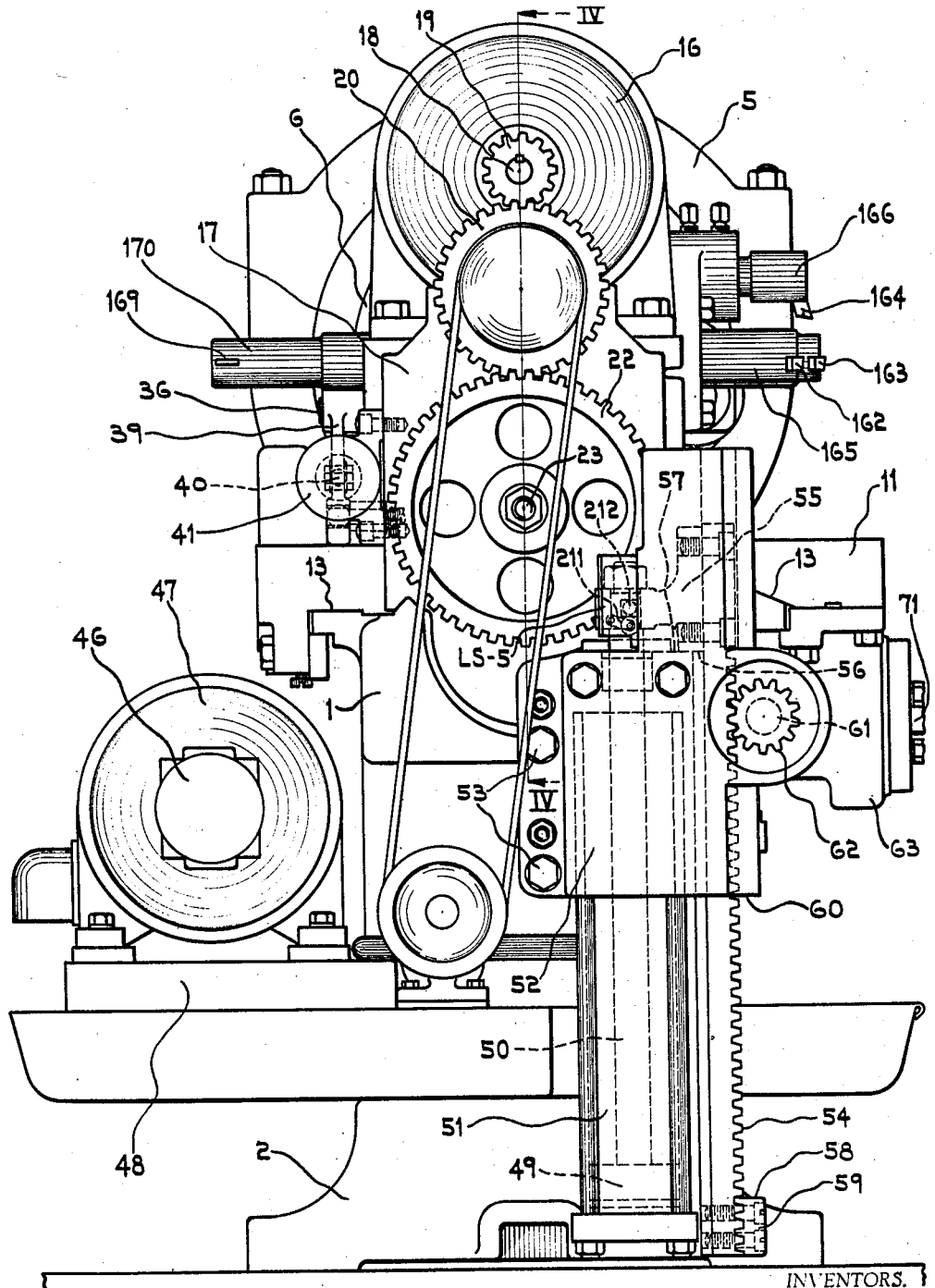
Fig. III
INVENTORS.
WILLIAM F. GROENE
HAROLD J. SIEKMANN
BY
ATTORNEY.

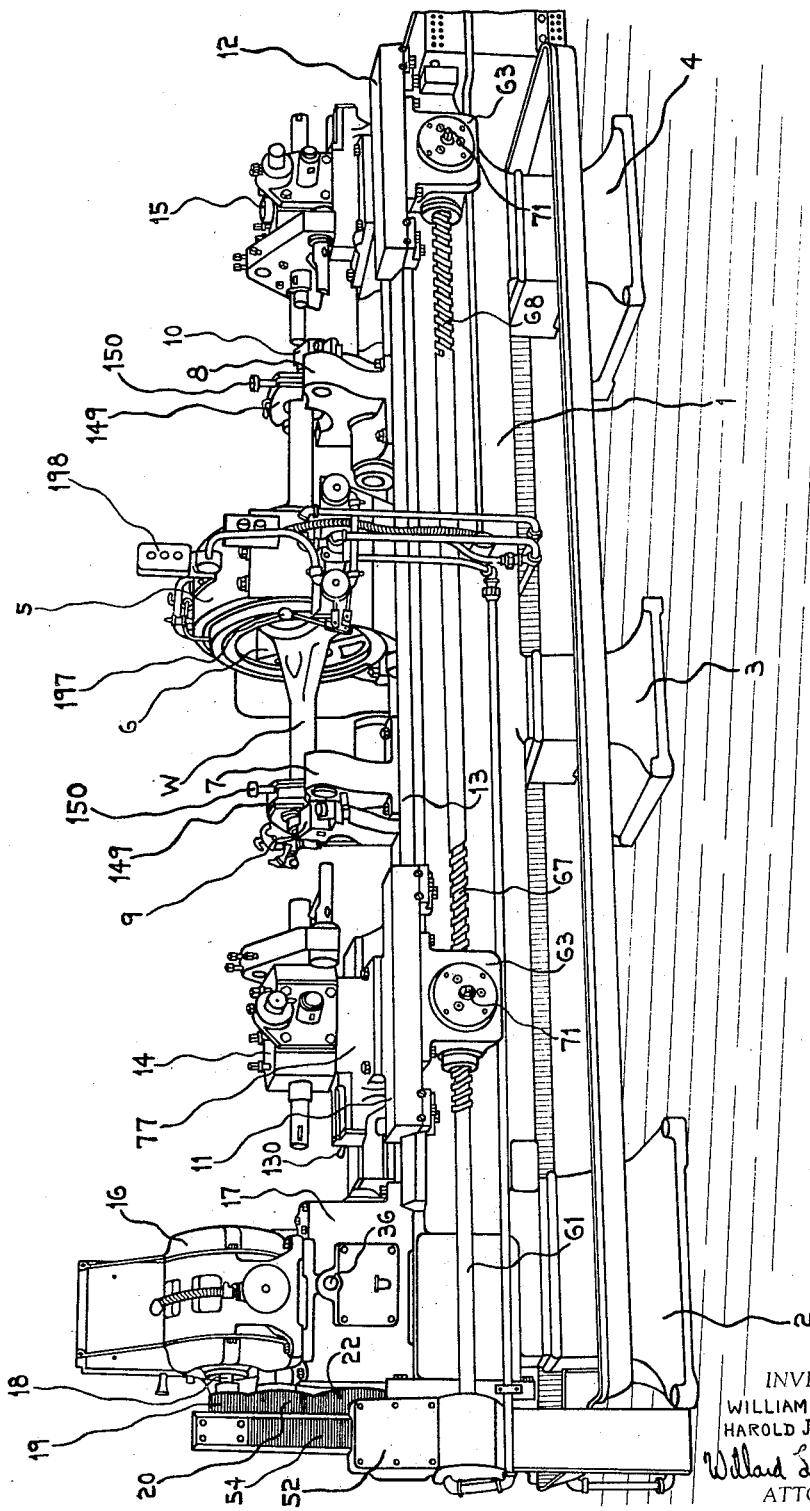

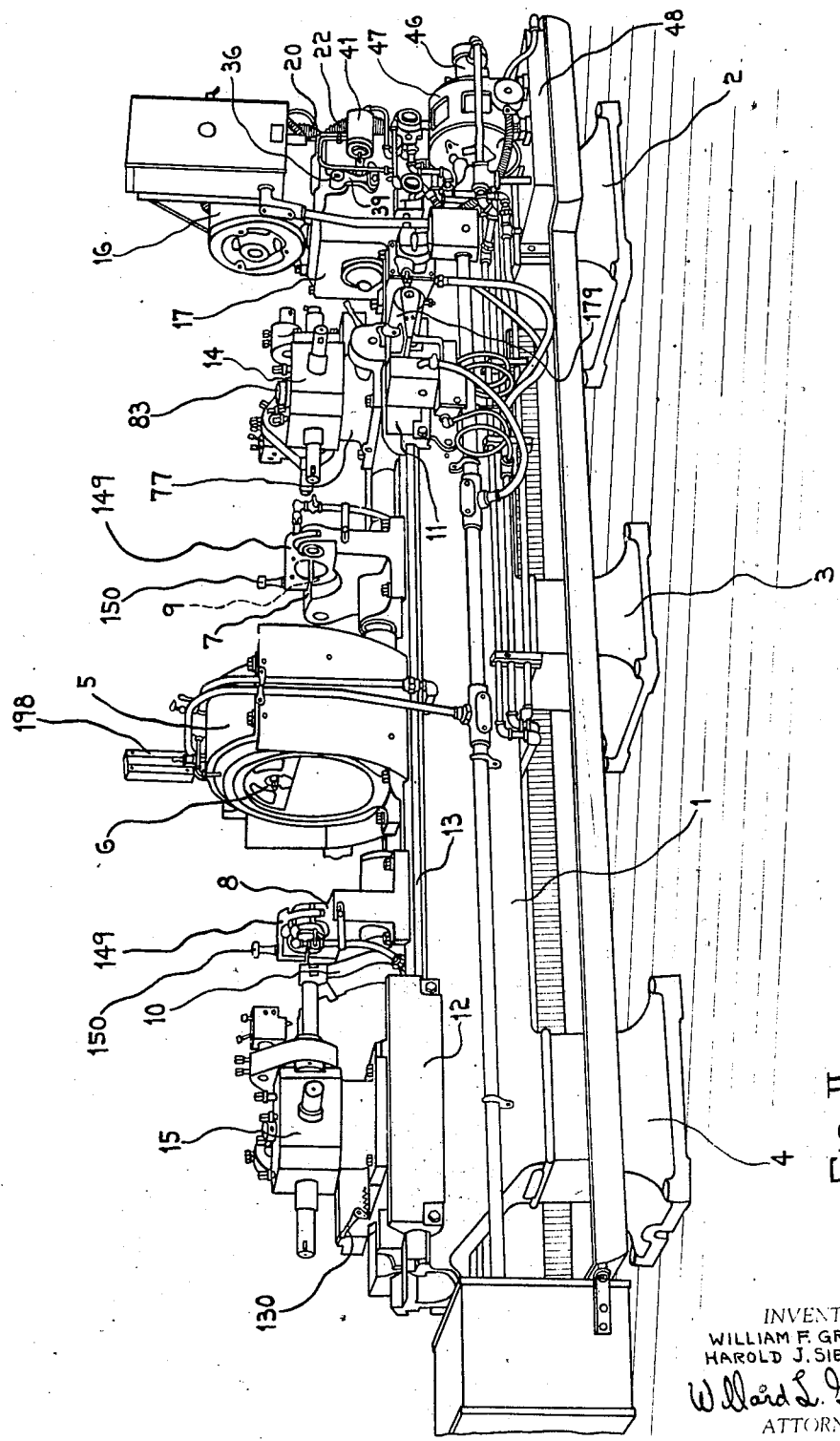
Fig. II

March 5, 1940.   W. F. GROENE ET AL   2,192,436
CENTER DRIVE DOUBLE END TURRET LATHE
Filed Sept. 27, 1937    16 Sheets-Sheet 4
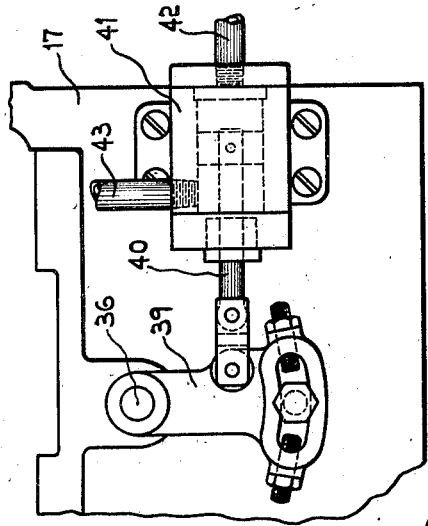
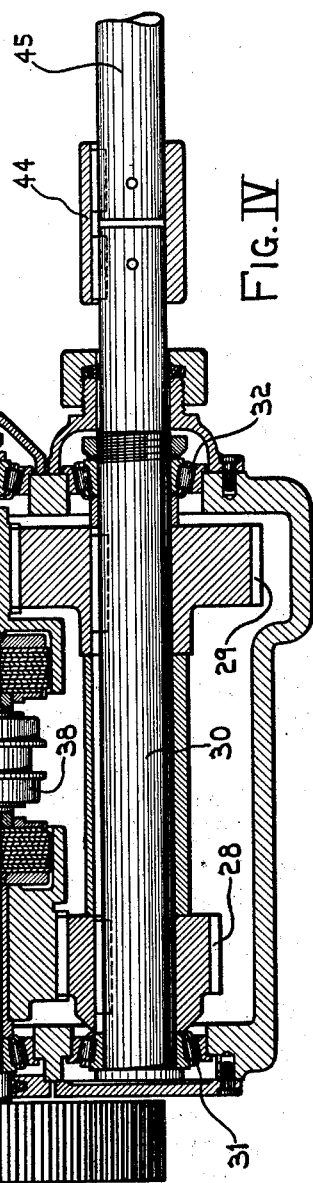
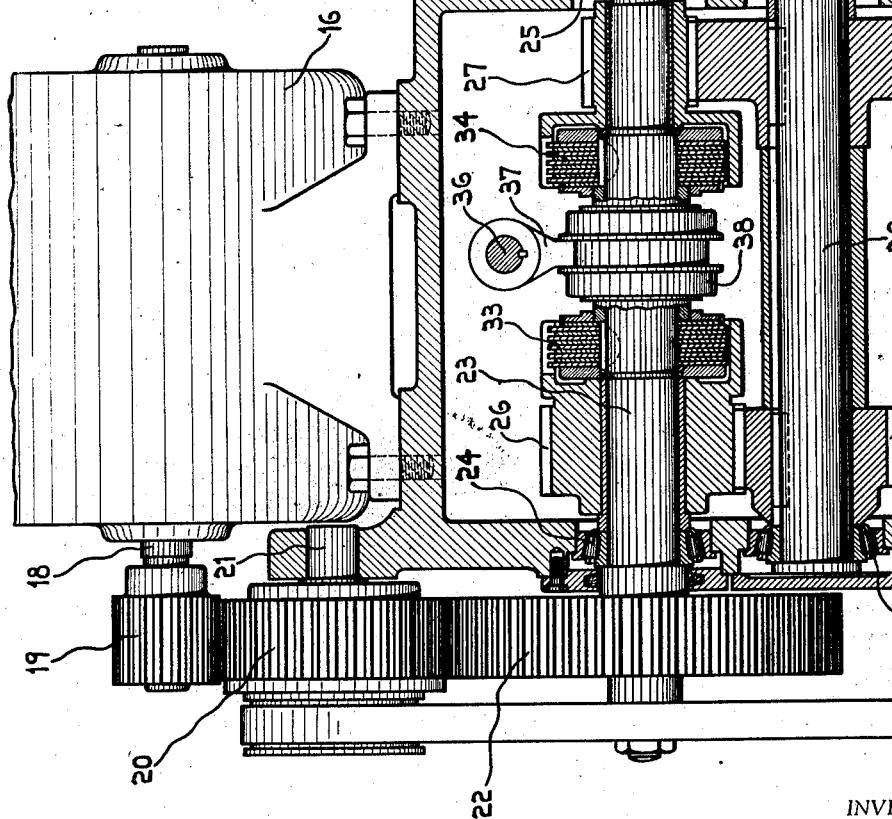
INVENTORS.
WILLIAM F. GROENE
HAROLD J. SIEKMANN
BY
ATTORNEY.

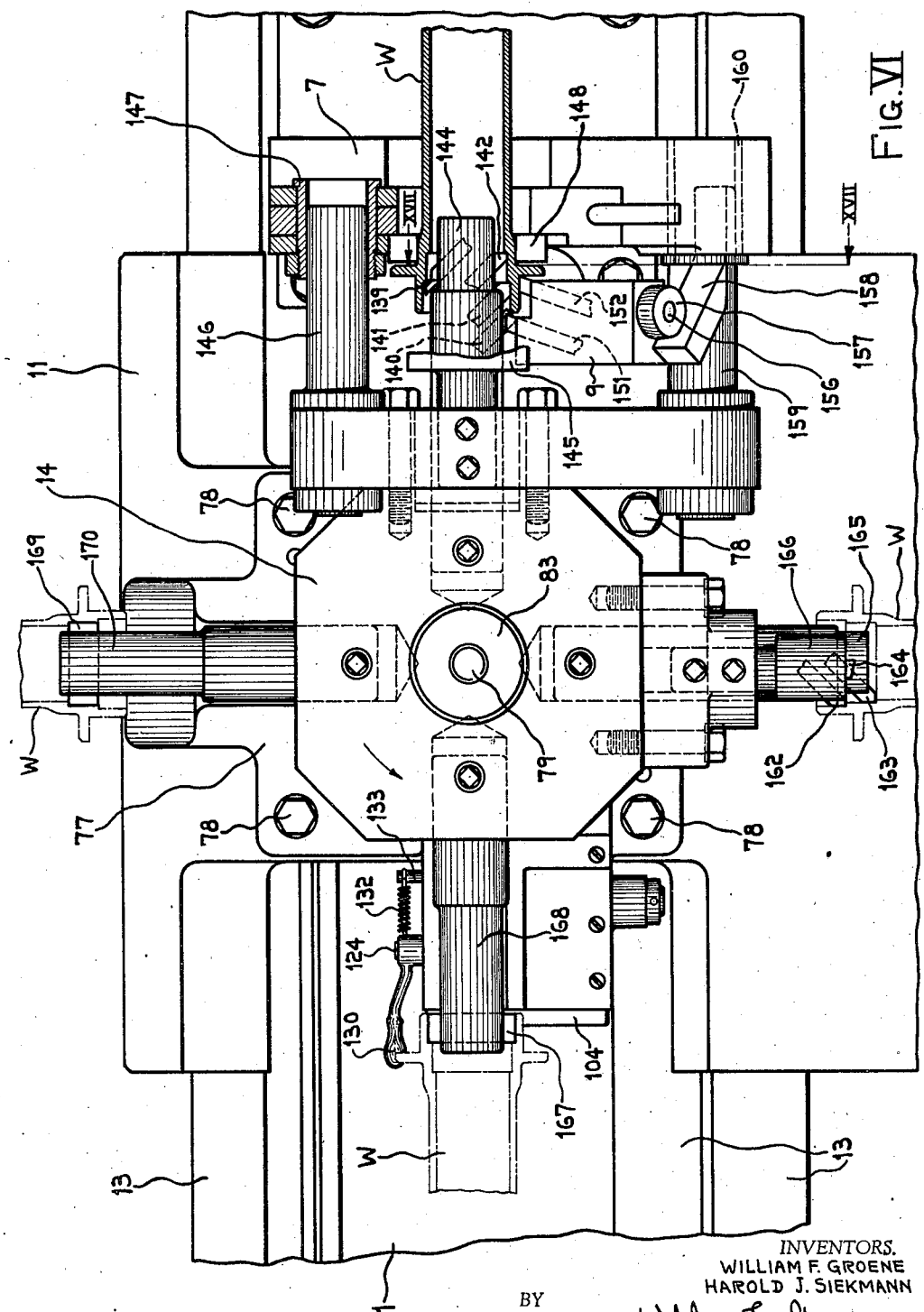

March 5, 1940. W. F. GROENE ET AL 2,192,436
CENTER DRIVE DOUBLE END TURRET LATHE
Filed Sept. 27, 1937 16 Sheets-Sheet 6
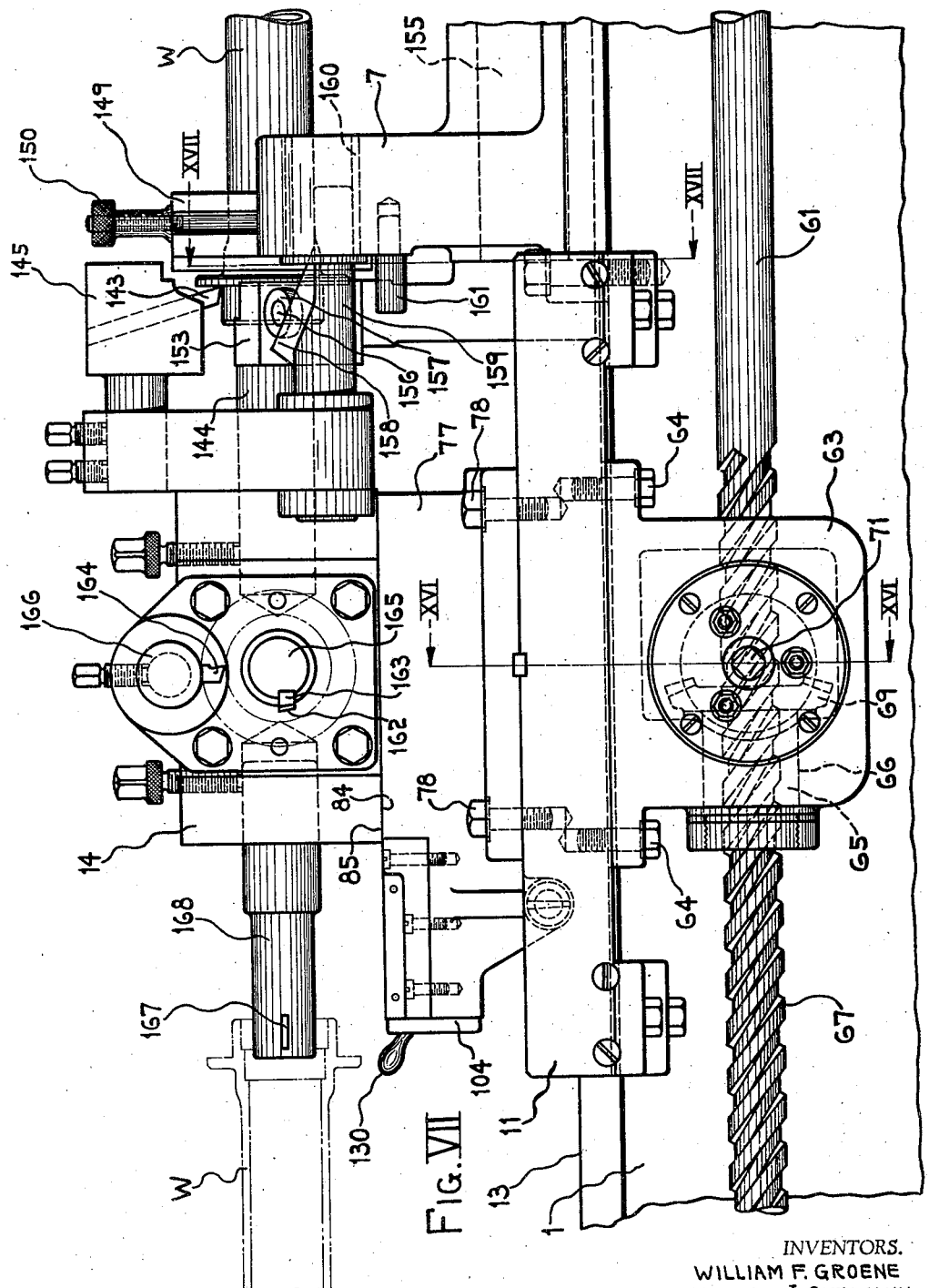
FIG. VII
INVENTORS.
WILLIAM F. GROENE
HAROLD J. SIEKMANN
BY Willard S. Groene
ATTORNEY.

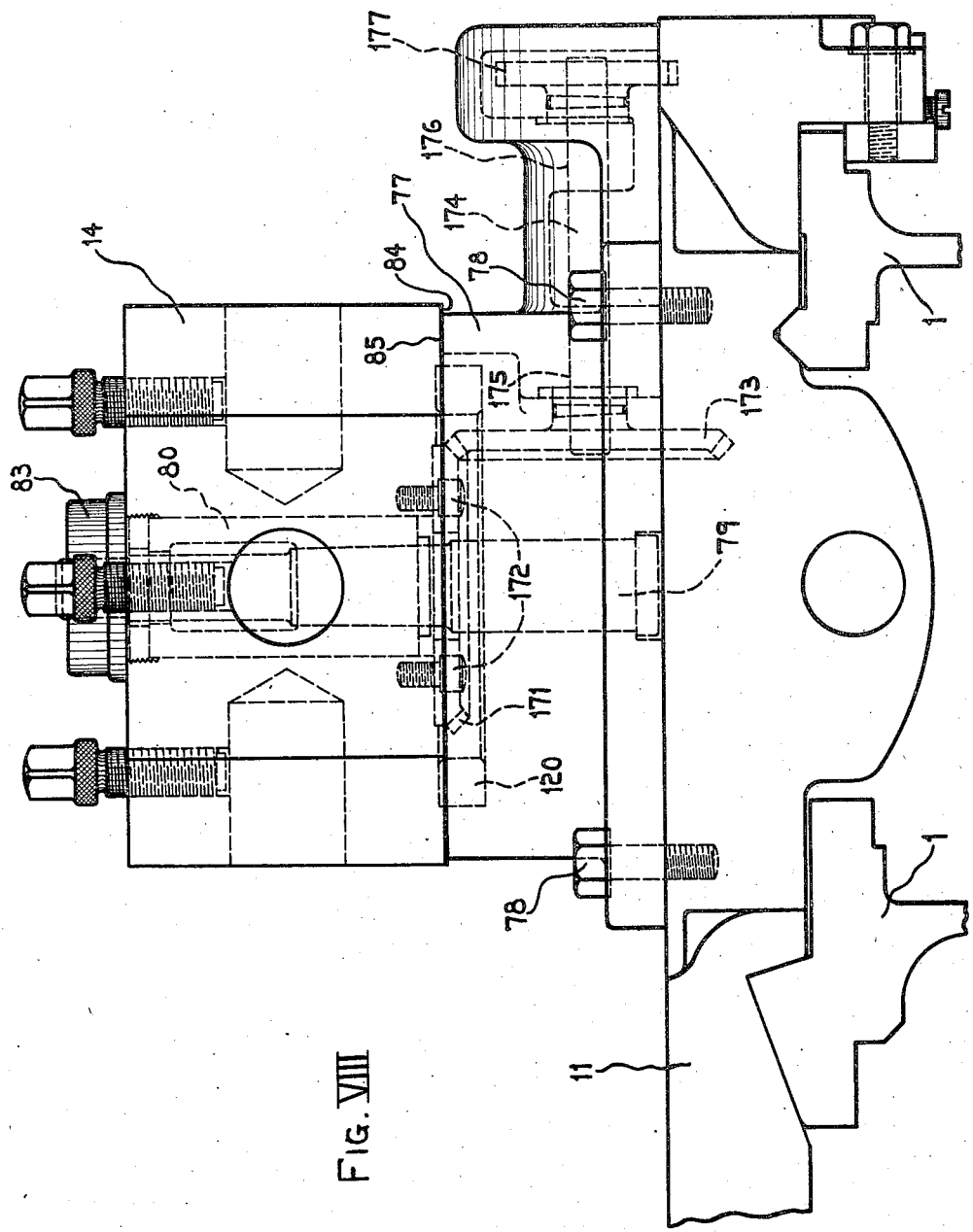

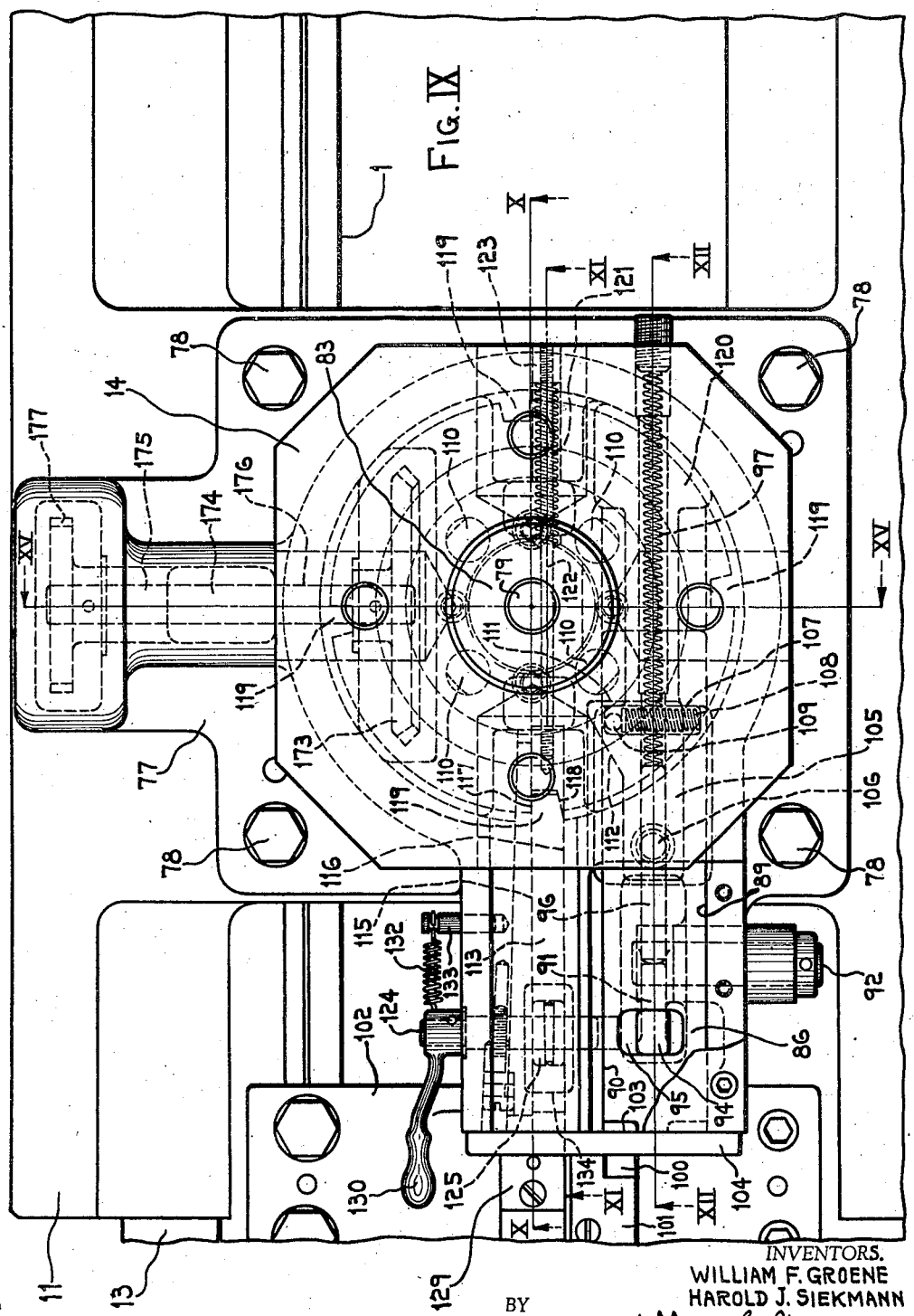

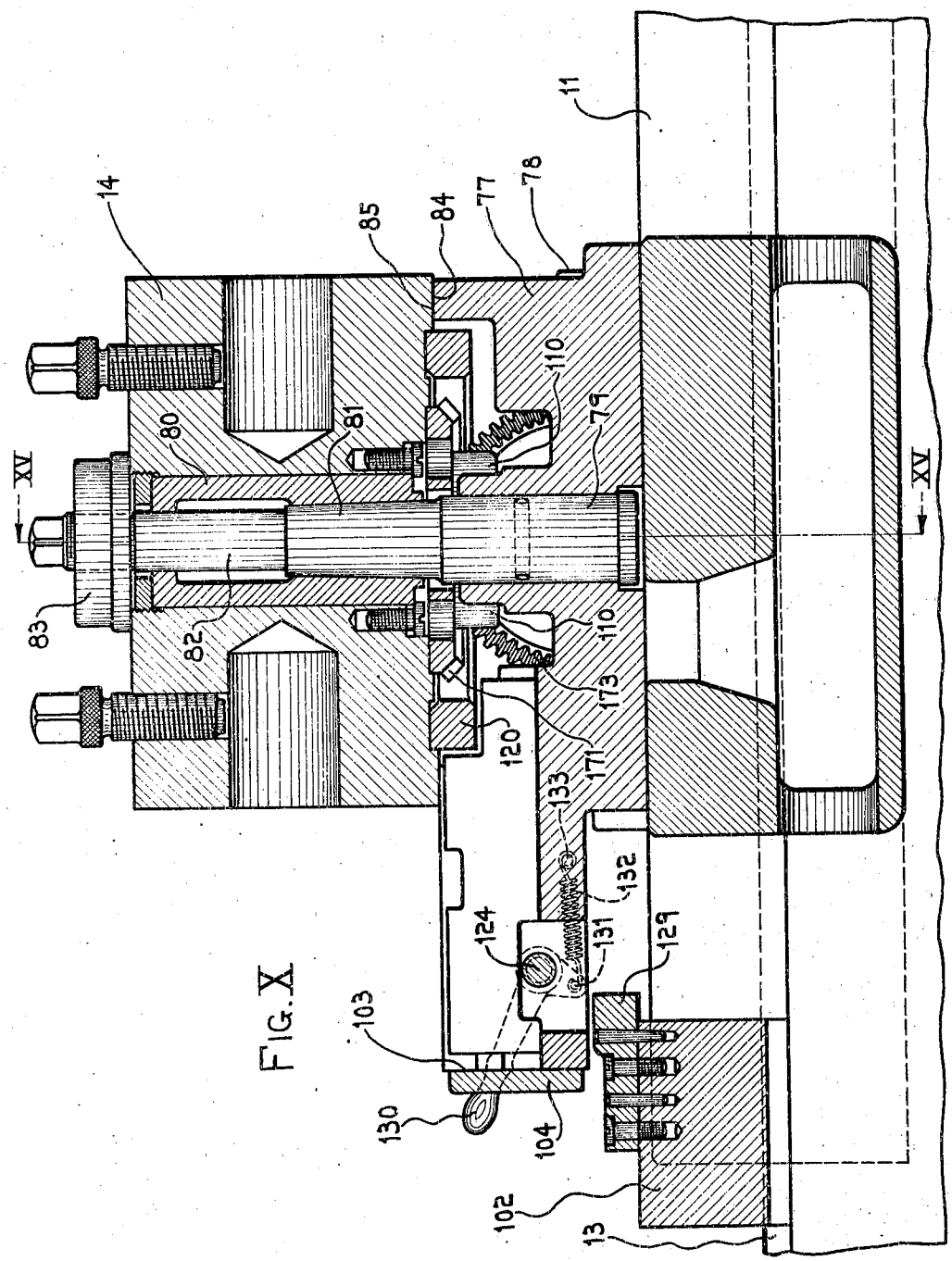

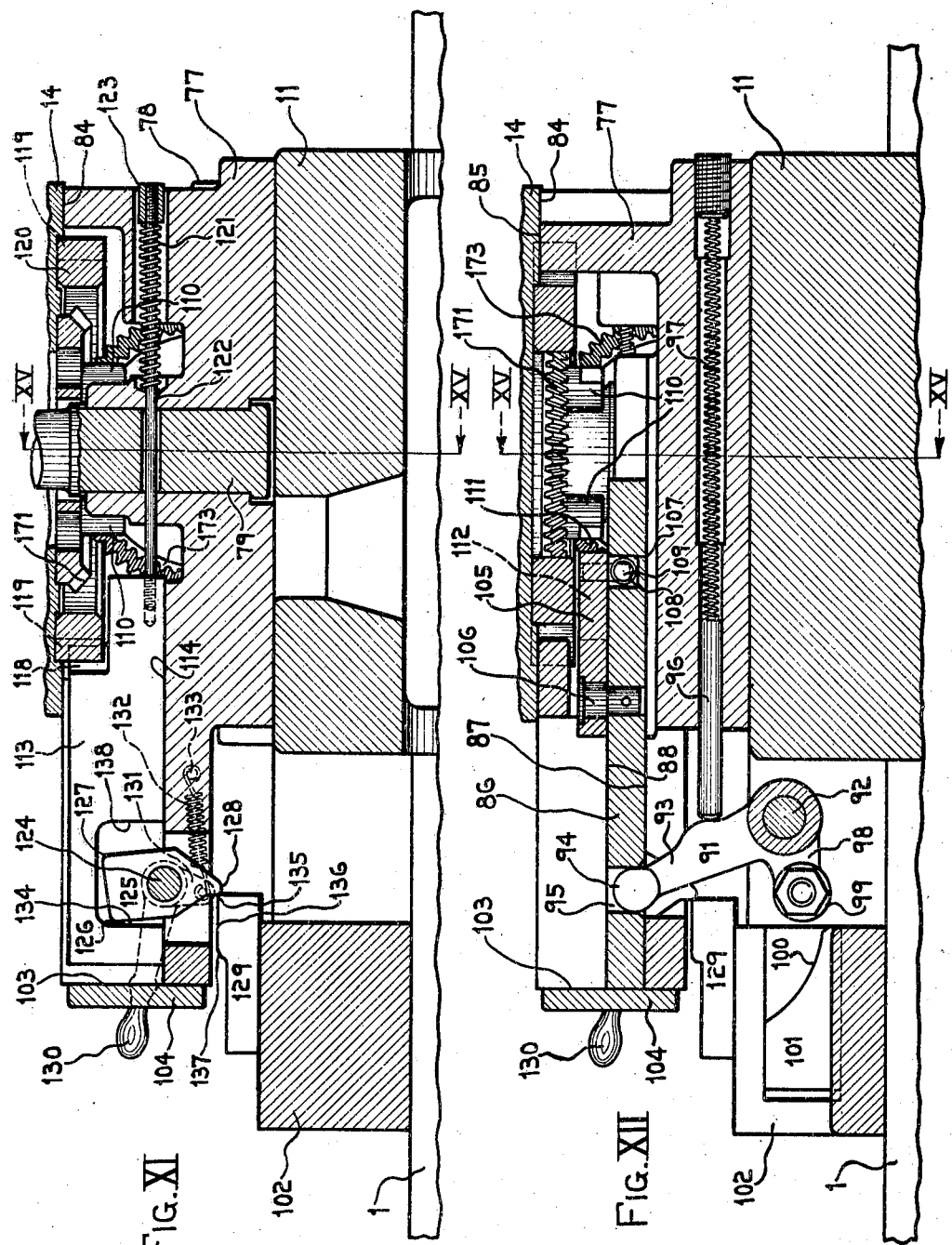

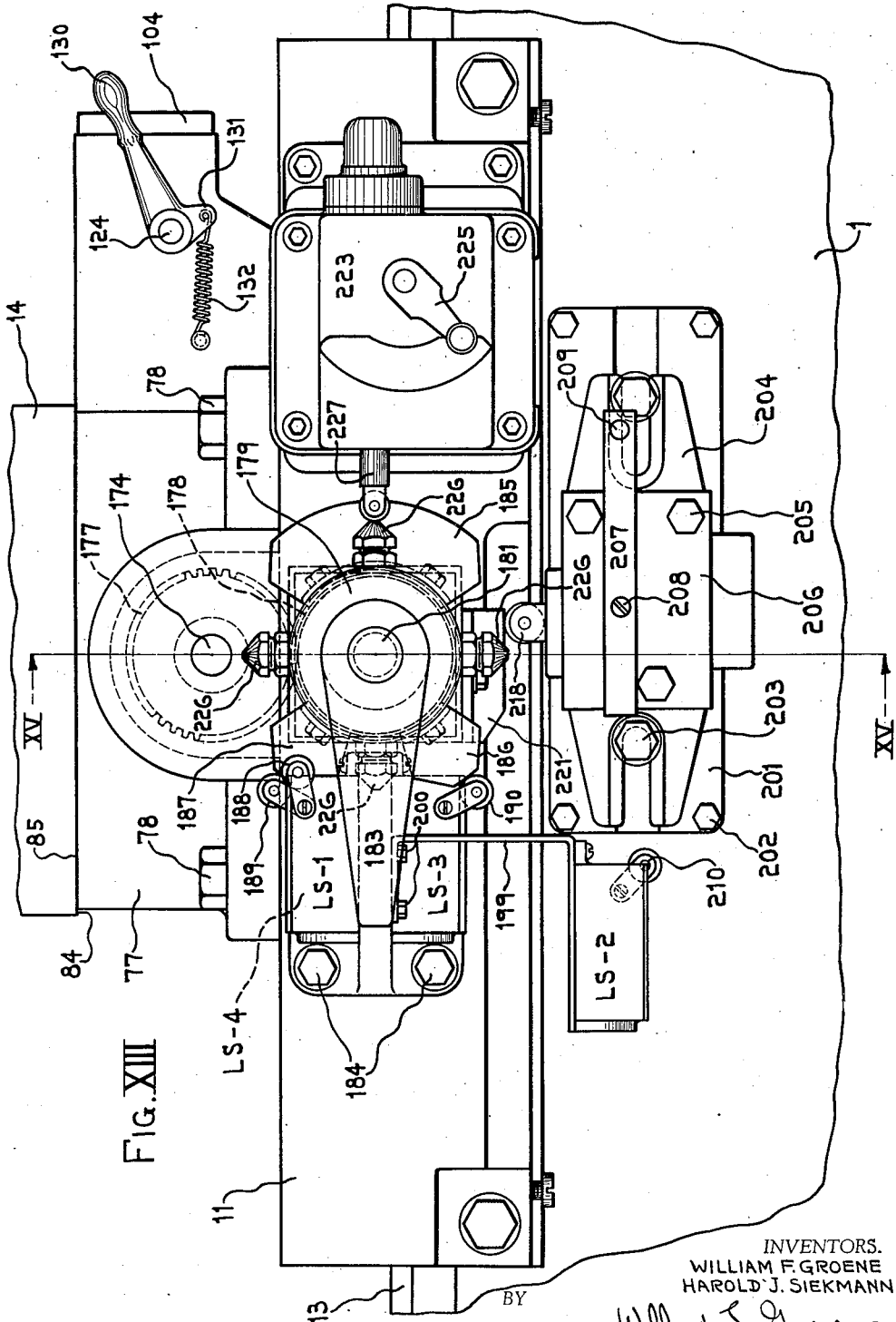

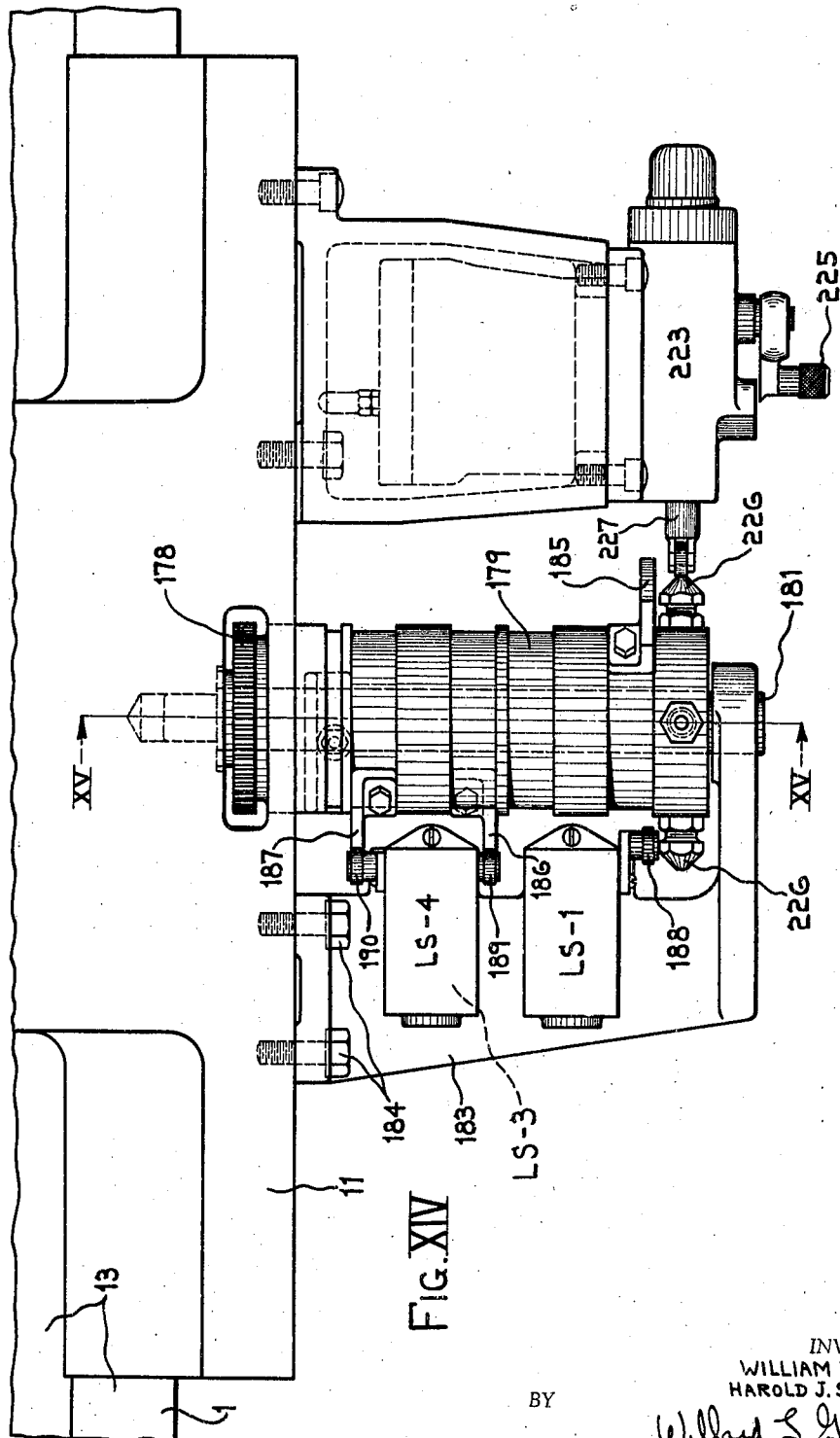

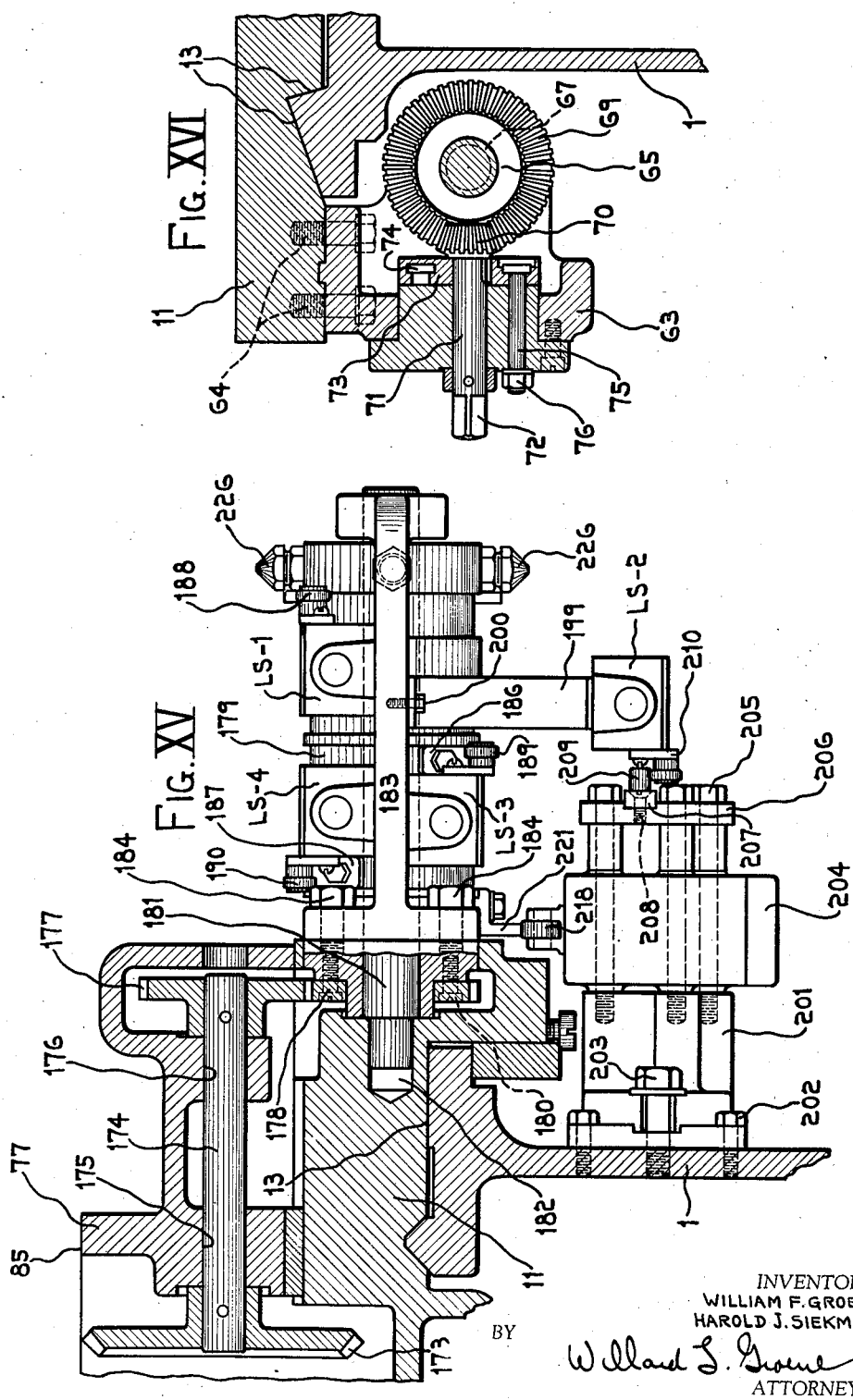

March 5, 1940.  W. F. GROENE ET AL  2,192,436
CENTER DRIVE DOUBLE END TURRET LATHE
Filed Sept. 27, 1937   16 Sheets-Sheet 14
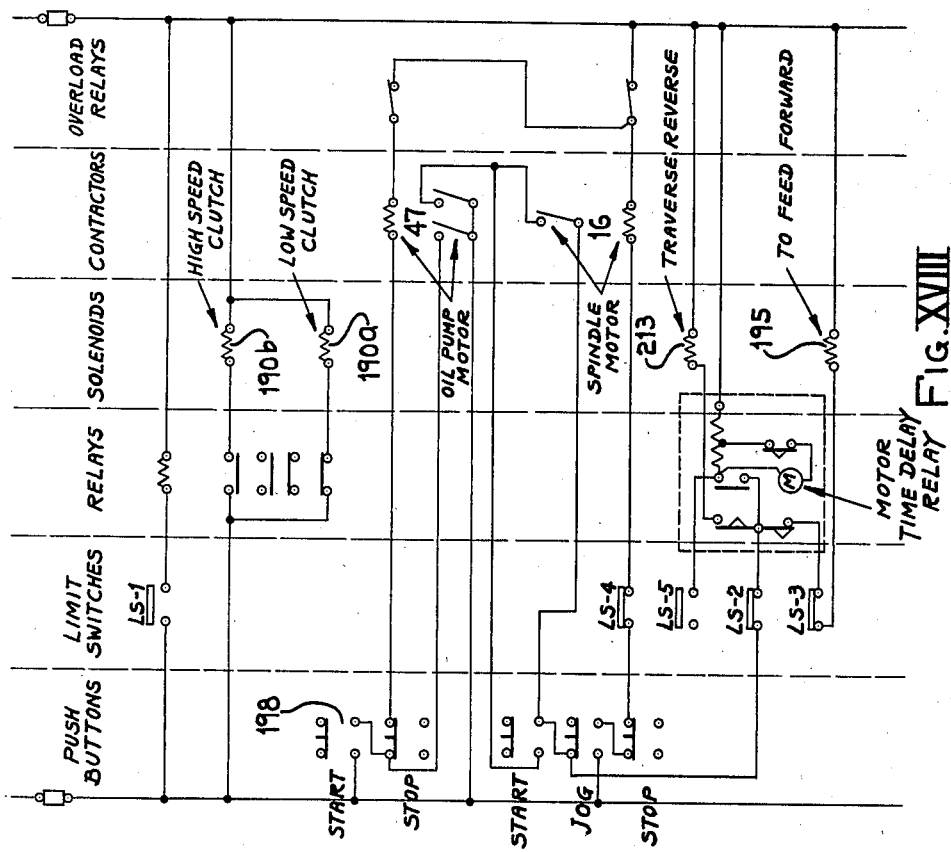
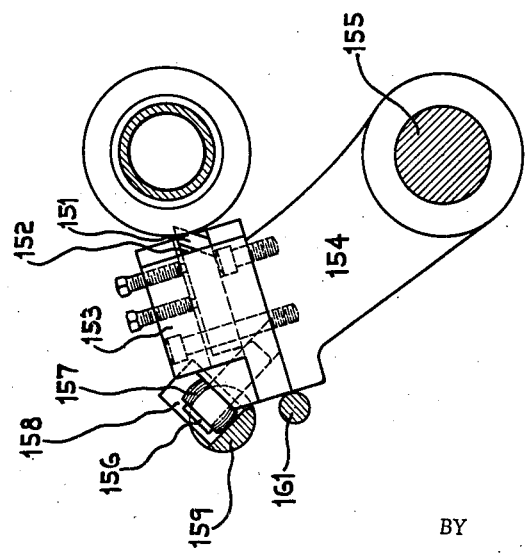
INVENTORS.
WILLIAM F. GROENE
HAROLD J. SIEKMANN
BY
Willard J. Groene
ATTORNEY.

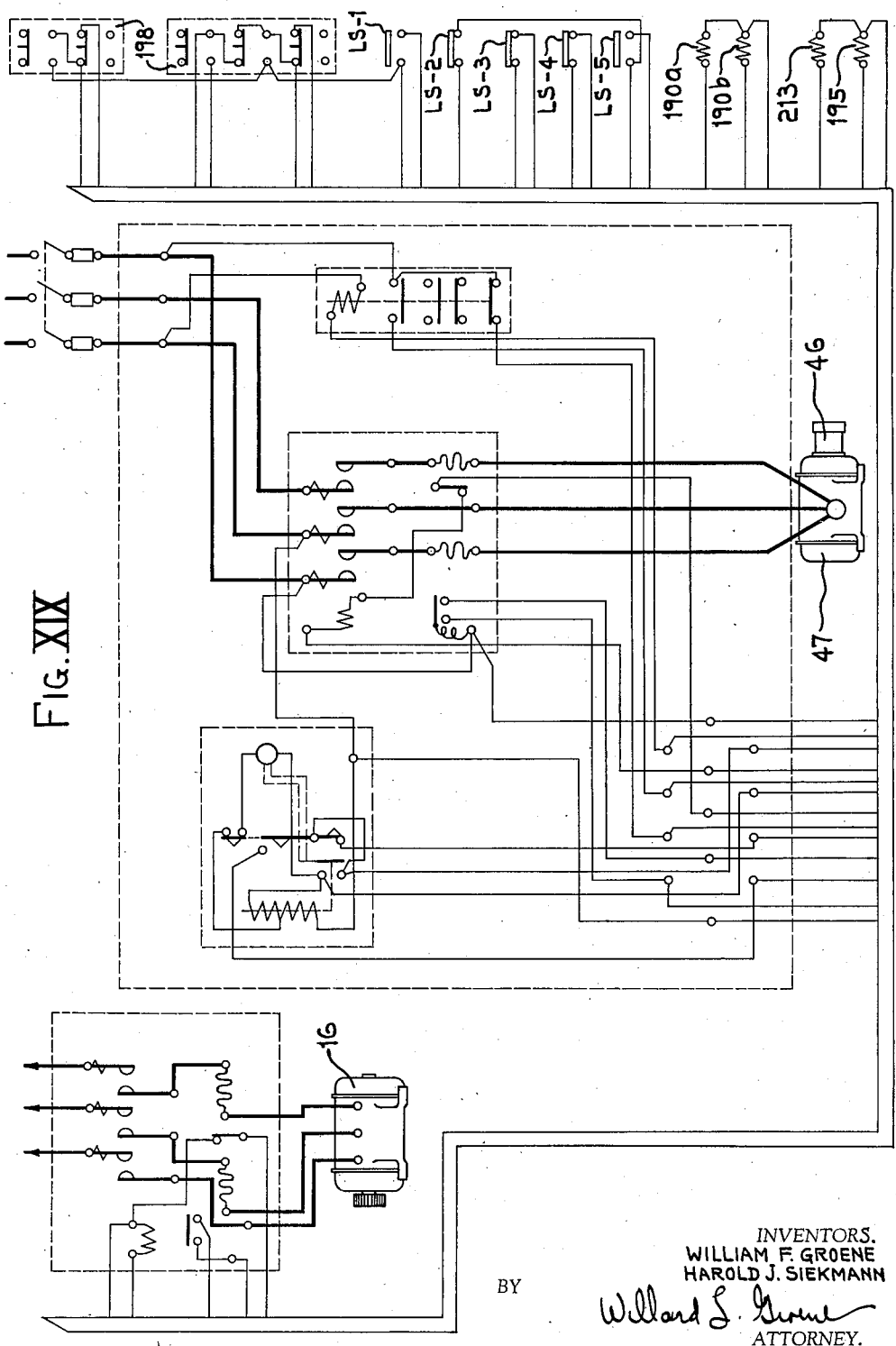

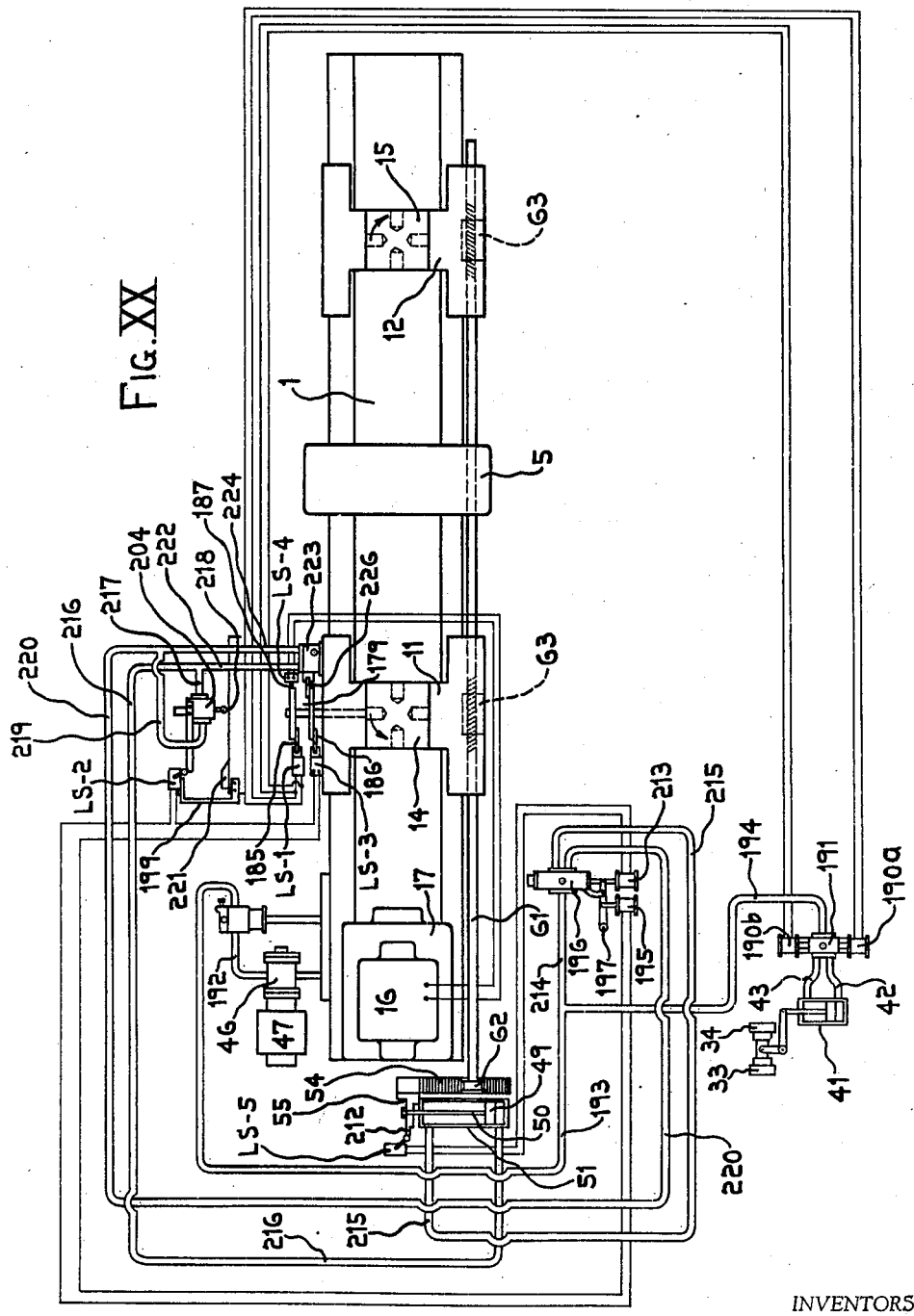

Patented Mar. 5, 1940

2,192,436

UNITED STATES PATENT OFFICE 2,192,436

CENTER DRIVE DOUBLE END TURRET LATHE

William F. Groene and Harold J. Siekmann, Cincinnati, Ohio, assignors to The R. K. Le Blond Machine Tool Company, Cincinnati, Ohio, a corporation of Delaware Application September 27, 1937, Serial No. 165,836

11 Claims. (Cl. 29—36)

This invention pertains to lathes, particularly center drive lathes adapted to machining the end portions of shafts or similar types of work pieces. More specifically our invention is adapted to the simultaneous machining of the end portions of axle housings in a series of progressive machining operations.

An object of our invention is to provide in a lathe means for supporting and rotating a work piece intermediate its ends and to successively apply cutting tools to the end portions of said work piece to simultaneously machine said end portions thereof.

Another object is to provide in a lathe means for supporting and rotating a work piece intermediate its ends and to provide steady rest means for supporting each end of the work piece.

Another object is to provide in a lathe means for supporting and rotating a work piece intermediate its ends, steady rest means for supporting each end of the work piece, and indexing tool carrying turrets with tools adapted to progressively machine the end portions simultaneously on said work piece.

Still another object is to provide in a lathe means for supporting and rotating a work piece intermediate its ends, steady rest means for supporting each end of the work piece, and tool feeding devices associated with said steady rests adapted to perform machining operations on the end portions of said work piece.

A still further object is to provide in a lathe means for supporting and rotating a work piece intermediate its ends, steady rest means for supporting each end of the work piece, indexing tool carrying turrets with tools adapted to machine the end portions of said work piece, and further tool feeding devices associated with said steady rests and operated by said turrets for performing machining operations on said end portions of said work piece.

And another object is to provide in a turret lathe automatic means for providing predetermined feeds and speeds of work rotation for each indexed position of the turret in performing each operation on a work piece.

Other features of our invention will be pointed out in the following description of the drawings in which—

Figure I is a front perspective view of a center drive double end turret lathe utilizing the principles of our invention.

Figure II is a rear perspective view of the lathe shown in Figure I.

Figure III is a left hand end elevation of the lathe shown in Figure I.

Figure IV is a view partly in section on the line IV—IV of Figure III particularly showing the speed change gearing for the work spindle or center drive chuck.

Figure V is an enlarged rear elevation of the change speed gear box particularly showing the hydraulically operated speed changing mechanism.

Figure VI is a plan view of the left hand indexing turret particularly showing the operations performed on the work piece and a steady rest and associated tool feeding device associated therewith for an end of the work piece.

Figure VII is a front elevation of the left hand turret shown in Figure VI.

Figure VIII is a right hand end elevation of the left hand indexing turret.

Figure IX is a plan view of the left hand turret.

Figure X is a vertical section on the line X—X of Figure IX.

Figure XI is a vertical section on the line XI—XI of Figure IX.

Figure XII is a vertical section on the line XII—XII of Figure IX.

Figure XIII is a rear elevation of a portion of the left hand carriage particularly showing the electric-hydraulic control apparatus associated therewith.

Figure XIV is a plan view of the carriage and apparatus of Figure XIII shown with the turret removed.

Figure XV is a partial vertical transverse section on the line XV—XV of Figures IX, XI, XII, XIII and XIV.

Figure XVI is a vertical transverse section on the line XVI—XVI of Figure VII.

Figure XVII is a vertical transverse section on the line XVII—XVII of Figures VI and VII particularly showing the tool feeding device associated with a steady rest of the lathe.

Figure XVIII is an elementary diagram showing the various pieces of electrical control apparatus utilized for the lathe.

Figure XIX is a wiring diagram of the electric operating and control system.

Figure XX is a diagrammatic layout of the hydraulic and electric system to more clearly point out their inter-relation and their functions.

The general arrangement of the lathe, as shown in Figures I and II, comprises a bed 1 mounted on suitable supporting legs 2, 3, and 4 upon which is mounted a suitable center drive head 5 which has a suitable ring gear chuck 6 adapted to support and rotate a work piece or axle housing W. Also mounted on the bed 1 each side of the work spindle 5 are steady rests 7 and 8 adapted to support the end of the work piece W. Tool feeding devices 9 and 10 are also respectively associated with said steady rests 7 and 8 and are adapted to perform machining operations on the ends of the work piece W.

Carriages 11 and 12 slidably mounted on the usual ways 13 of the bed 1 have the respective indexing tool turrets 14 and 15 having appropriate tools which may be successively presented to the work piece W for machining the end portions thereof.

Work spindle drive

Power for rotating the chuck 6 is derived from the motor 16 which is mounted on the change speed gear case 17 which in turn is mounted on the left hand end of the bed 1. Noting particularly Figures III and IV, on the motor shaft 18 is fixed a pinion 19 which drives the idler gear 20 rotatably mounted on a suitable stud 21 fixed on the gear case 17, the idler gear in turn driving the gear 22 fixed on the clutch shaft 23 rotatably mounted on appropriate anti-friction bearings 24 and 25 in the gear case 17. Loosely journaled on the shaft 23 is the large pinion 26 and the small pinion 27 which are adapted to engage respective mating gears 28 and 29 fixed on the drive shaft 30 also journaled in the gear case 17 on suitable anti-friction bearings 31 and 32. Suitable multiple disc clutches 33 and 34 may be rendered effective to alternately cause gear 26 or gear 27 to be driven by the shaft 23 whereby the shaft 30 may be caused to rotate at different speeds by suitably rocking the rock shaft 36 having the usual yoke 37 fixed thereto for actuating the usual clutch operating spool 38 for the clutches 33 and 34. Noting Figure V, the rock shaft 36 projects outwardly through the rear of the gear case 17 and has a lever 39 fixed thereon to which is connected the piston rod 40 of a hydraulic cylinder 41 whereby the clutches 33 and 34 may be rendered effective by appropriately applying hydraulic pressure through the lines 42 and 43 of said cylinder 41. Connected to the drive shaft 30 by a suitable coupling 44 is the shaft 45 which has its other end suitably journaled in the center drive head 5 and having the usual gearing associated therewith for driving the ring gear chuck 6.

Carriage feed mechanism

Power for actuating the carriages 11 and 12 along the ways 13 of the bed 1 is derived from the hydraulic fluid pressure pump 46 (Figures II and III) mounted on and driven by the motor 47 mounted on the bracket 48 attached to the rear of the leg 2 which delivers fluid pressure through appropriate means for reciprocating the piston 49 attached to piston rod 50 of the cylinder 51, the cylinder 51 being mounted in the bracket 52 attached to the bed 1 by suitable bolts 53. In the bracket 52 is slidably mounted the rack 54 which is attached to the piston rod 50 by a suitable bracket 55 for reciprocation therewith, the downward movement of the rack being limited by the surface 56 of the bracket 55 striking the surface 57 of the bracket 52; the upward movement of the rack being limited by the surface 58 of the stop block 59 attached to the rack striking the surface 60 of the bracket 52.

Noting particularly Figures I, III, VII, and XVI, extending longitudinally along the bed 1 is the feed screw 61 which is suitably journaled in the bracket 52 and has a pinion 62 engaging the rack 54 whereby reciprocation of the rack causes corresponding rotation of the screw 61. On each of the carriages 11 and 12 is mounted a nut box 63 by suitable bolts 64, each of which has a rotatable nut 65 journaled without axial movement in a suitable bearing 66 in the nut box 63 and appropriately threaded to engage the right hand screw thread 67 for carriage 11 and the left hand screw thread 68 for the carriage 12. The nuts 65 are provided with an integral bevel gear 69 which is engaged by a bevel pinion 70 formed on the shaft 71 journaled in the nut box 63 and which has a squared end portion 72 to which may be applied a suitable crank handle for rotating the nut 65 whereby the carriages may be adjusted axially of the screw 61 and the bed 1 when the screw 61 is not operating. A disc 73 keyed to rotate with the shaft 71 has T slots 74 from which extend bolts 75 having clamping nuts 76 which when tightened secure the disc 73 and the shaft 71 against rotation and thereby prevent rotation of the nuts 65 when the carriages have been properly positioned along the bed 1 and are to be actuated by rotation of the screw 61 upon reciprocation of the cylinder 52 as described, the right hand thread 67 and the left hand thread 68 causing the carriages to move toward or away from each other.

Indexing turret mechanism

The rotation and indexing of the turrets 14 and 15 is accomplished by the longitudinal movement of the carriages 11 and 12 on the bed 1 of the lathe. Since the mechanism for effecting the indexing of the turrets is the same for both carriages a description of the left hand carriage 11 with its turret 14 will suffice for both.

Noting particularly Figures IX, X, XI, and XII, on the carriage 11 is bolted a turret base 77 by bolts 78 and in which is tightly fitted a vertical stud 79. The turret 14 has an adjustable bushing 80 which is arranged to rotate snugly about the stud 79 on its bearing surfaces 81 and 82 a lock nut 83 carried on the upper end of the stud 79 serving to prevent upward movement of the turret 14 and to maintain its under surface 84 in proper sliding engagement with the thrust bearing surface 85 provided on the top of the turret base 77 so that the turret 14 may be rotated while maintaining its proper aligned position on the carriage 11.

The turret 14 is rotated by the arrangement shown in Figures IX and XII which comprises a bar 86 slidably mounted for movement parallel with the direction of carriage movement in suitable guideways 87, 88, 89, and 90 formed in the base 77. The bar 86 is normally urged to the left by a bell crank lever 91 pivotally mounted on the stud 92 carried in the base 77 which has on one of its arms 93 a rounded end 94 which engages into a slot 95 in the bar 86, a spring urged plunger 96 actuated by spring 97 suitably mounted in a hole in the base 77 serving to urge the arm 93 and thus the bar 86 to the left. On the end of the other arm 98 of the bell crank 91 is mounted a roller 99 which is caused to engage and ride up the cam surface 100 of the block 101 fixed in a bracket 102 fixed on the bed 1 of the lathe when the carriage is moved away for the work piece being machined and to thereby cause the bar 86 to move to the right away from the surface 103 of the stop plate 104.

Mounted on the bar 86 is a pawl 105 pivotally mounted on a stud 106 fixed in the bar 86. In a cavity 107 formed in the bar 86 is a spring 108 which engages the end of a pin 109 fixed in the outer end of the pawl 105 so as to normally urge the pawl 105 counter-clockwise about its pivot as seen in Figure IX. On the under side of the turret 14 is fixed a series of projecting pins 110 corresponding to the number of indexed positions to which the turret is to be moved. These pins are so placed that when the carriage 11 is moved to the left and away from the work the bar 86 will be moved to the right as described and cause the abutment face 111 of the pawl to be moved against a pin 110 and by continuing its movement against said pin to cause the turret to rotate counter clockwise as shown in Figure IX. The cam 100 is so arranged as to cause the bar to move sufficient to rotate the turret 14 to the next indexed position by the time the carriage has fully retracted from the work piece.

As the carriage again moves toward the work the bar 86 is returned to the left by spring 97, the pawl 105 being likewise carried to the left, its angular surface 112 striking against one of the pins which has been brought to the position occupied by the pin which has just been pushed to the right or counterclockwise by the face 111 of the pawl. The bar 86 and its pawl 105 continue to move to the left, the surface 112 of the pawl riding against a pin 110 swinging the pawl clockwise and compressing the spring 108. After the bar 86 has fully retracted to the left the face 111 of the pawl is to the left of the pin 110 so that the pawl snaps back counterclockwise under the influence of spring 108 in readiness for again engaging its face 111 with another pin 110.

The turret is accurately indexed by the arrangement shown in Figures IX and XI which comprises the indexing plunger 113 slidably mounted in guideways 114, 115, and 116 in the base 77. The indexing faces 117 and 118 of the plunger 113 are normally urged into the indexing notches 119 in the indexing ring 120, carried on the bottom of the turret 14, by a spring 121 which surrounds a pull rod 122 threaded in the end of the indexing plunger 113, and which spring bears against a portion of the base 77 and a nut 123 threaded on the outer end of the rod 122.

Mounted on the rock shaft 124 carried in the base 77 is an actuating dog 125 having an upwardly extending portion with corners 126 and 127 and a downwardly extending end 128 which is adapted to be engaged by a cam block 129 fixed on the bracket 102 when the carriage 11 is moved along the bed. On a projection of the rock shaft 124 is mounted a lever 130 for manually rotating the shaft 124. A projection 131 is provided on the lever 130 to which is attached a tension spring 132 which in turn is fastened to a pin 133 fixed in the base 77 so that the lever 130 and rock shaft 124 are normally rotated in a counter-clockwise direction as seen in Figure XI. The spring 132 is so designed as to normally maintain the corner 126 of the dog 125 in contact with the surface 134 formed in the plunger 113 but still of not sufficient strength to move the plunger 113 to the left and compress the spring 121.

It will thus be seen that when the carriage 11 is moved back from cutting position and away from the work the end 128 of dog 125 will strike the corner 135 of block 129 and cause the dog 125 and its shaft 124 to rotate counterclockwise, the corner 126 of dog 125 engaging surface 134 of the indexing plunger 113 to withdraw it from the slot 119 in the indexing ring 120. Further movement of the carriage away from the work causes the end 128 to slide along the straight surface 136 of the block 129 thus holding the indexing plunger 113 withdrawn from the ring 120 during which time the turret rotating mechanism described above in Figures IX and XII is operating to rotate the turret 14 to another indexed position. At the completion of the movement of the carriage away from the work the end 128 has ridden off surface 136 over the corner 137 of block 129 allowing the indexing plunger 113 to again move toward the indexing ring 120 and enter a slot 119 under the influence of the spring 121. As the carriage 11 moves forward the end 128 again contacts the corner 137 of block 129 and rides along the surface 136 until it drops over the corner 135 preparatory for again withdrawing the plunger 113 upon return of the carriage from the work. During this forward movement of the carriage sufficient clearance is provided between the corner 127 and face 138 that the clockwise movement of the dog 125 will have no effect on the movement of the indexing plunger 113 during forward carriage movement. By pushing downward on the lever 130 the indexing plunger, when the carriage is in proper position, may be withdrawn for purposes of rotating the turret 14 manually.

*Tooling*

Noting particularly Figures I, VI, VII, and XVII, each of the turrets 14 and 15 have tools for four stages of operation on the flange ends of the axle housing W. In Figures VI and VII the first operation is that of roughing out the end of the axle housing W by longitudinally moving the roughing tools 139, 140, 141, 142, and 143 carried on appropriate tool holders 144 and 145 fixed to the turret 14. The usual pilot bar 146 sliding in the bushing 147 of the steady rests 7 and 8 serve to give added support to the turret during this roughing operation. Also in these steady rests 7 and 8 are the half bushings 148 and cooperating swinging caps 149 with locking bolts 150 to maintain the ends of the work in proper running support in the steady rests.

Facing or transversely moving tools 151 and 152 are also simultaneously applied to the work with the roughing tools for facing off the flange and end of the housing W. These facing tools are carried in a tool block 153 fixed on a swinging arm 154 pivotally mounted on a stud 155 supported in the frame of the steady rest 7. Fixed in the tool block 153 at the outer end of the swinging arm 154 is a stud 156 carrying a roller 157 which is engaged by a slanting cam surface 158 carried on a pilot bar 159 which slides in a bushing 160 in the steady rest 7 so that when the turrets feed longitudinally toward the work the roller 157 will ride up the cam surface 158 and cause the tools 151 and 152 to be fed transversely into the work. When the turrets withdraw, the tool feeding devices 9 and 10 swing away from the work by gravity and rest against a suitable stop pin 161 and remain so disposed during the other three finishing operations.

Upon completion of the above roughing operation the turrets 14 and 15 are indexed and finishing tools 162 and 163 finish bore the ends of the housing W and the tool 164 finish turns the outside diameter of the end of the housing W these tools being carried by the turrets in appropriate tool holders 165 and 166.

The turrets are then indexed for the third operation of finish reaming the large bore by the reamer 167 carried in the tool holder 168.

The fourth and last operation is accomplished by again indexing the turret and applying the reamer 169 in the tool holder 170 to finish ream the smaller bore in the end of the housing W.

*Control mechanism*

This lathe is provided with electrically controlled operating mechanism whereby predetermined different rates of feed and speed of rotation of the work being operated upon may be automatically obtained for each indexed position of the turrets 14 and 15. For example referring to Figures VI and VII when the roughing tools 139, 140, 141, 142, 143, 151, and 152 are operating a coarse feed with rapid work rotation is desirable. When the finish boring and turning tools are being used a fine feed with rapid work rotation is found best. And during the finish reaming operations a coarse feed with slow work rotation is necessary to prevent chatter and provide a smooth accurate finish. These functions may all be automatically accomplished without any attention on the part of the operator by the novel mechanism to be described below.

Since both of the carriages 11 and 12 with their respective turrets perform the same operations it is necessary to use only one of the carriages with its turret for controlling the cycle of operation of the lathe. The left hand carriage 11 and its turret 14 have been selected in this lathe. On the bottom of the turret 14 as best seen Figures VIII and XV is fixed a bevel gear 171 concentric with the axis of rotation of the turret 14 by screws 172 which engages a bevel gear 173 having the same number of teeth as bevel gear 171, this second bevel gear 173 being fixed on a shaft 174 rotatably mounted in bearings 175 and 176 formed in the base 77. The shaft 174 extends rearwardly of the carriage 11 and base 77 and has fixed on its outer end a gear 177 which meshes with a like gear 178 fixed to a dog carrying drum 179 by screws 180, the drum in turn being rotatably mounted on a stud 181 driven in a bore 182 formed in the rear face of the carriage 11, the outer end of the stud 181 being supported by a bracket 183 extending outward from and being fastened to the rear of the carriage 11 by bolts 184. By this arrangement the drum 179 is caused to rotate in exact synchronism with the rotation of the turret 14.

Bolted to the drum 179 are dogs 185, 186, and 187 which engage and actuate the roller arms 188, 189, and 190 of the respective limit switches LS—1, LS—3, and LS—4.

Limit switch LS—1 is for effecting the change of speed of work rotation and controls the solenoids 190a and 190b of the hydraulic valve 191, Figure XX, whereby fluid pressure delivered through lines 192, 193, and 194 may be directed to either line 42 or 43 of cylinder 41 for rendering one or the other of the clutches 33 or 34 effective to cause a speed change for the center drive gear as described. By properly positioning the dog 185 on the drum a low or a high speed of work rotation may be automatically obtained for any indexed position to which the turret 14 may be rotated. This limit switch LS—1 is to be held closed while the clutch 33 is operative for high spindle speed and to be open for low spindle speed; this limit switch controlling appropriate relays which in turn cause proper operation of the solenoids 190a and 190b of the valve 191.

Limit switch LS—3 is a normally closed switch which is actuated by the dog 186 on the drum 179. This dog 186 is so positioned as to hold the switch LS—3 open only when the turret is indexed to the first operation or loading position to prevent the forward feed solenoid 195 of the feed direction control valve 196 from being automatically energized. After the work piece W has been changed and the main driving motor 16 has been started, it will be necessary to throw the hand lever 197 of the control valve 196 to the forward feed position to start the carriages feeding toward the work W, but from this point the solenoid 195 will be automatically operated at the beginning of the second, third, and fourth operations. The purpose of this switch LS—3 is to prevent automatic operation at the loading station and to bring the feeding cycle to a stop at the beginning of the first operation.

Limit switch LS—4 is a normally closed limit switch which is operated by the dog 187 on the drum 179 which is so positioned as to open the limit switch LS—4 for approximately ⅕ of a second as the turret turns between the fourth operation position and the first operation position. This limit switch when so actuated stops the main driving motor 16 at the completion of the machining cycle. This switch must again be closed by the time the turret has fully turned to the loading or first operation position so that when the starting push button 198 Figure I is pressed the spindle starts rotating for the next machining cycle.

Limit switch LS—2 is a normally open switch which is carried on a bracket 199 bolted to bracket 183 by bolts 200. On the bed 1 of the lathe is bolted a support 201 by bolts 202 and 203 to which in turn is bolted a feed and rapid traverse selector valve 204 by bolts 205 which also pass through and support a plate 206. On this plate 206 is mounted a bar 207 by a screw 208 which carries near one of its ends a dog pin 209 which is adapted to engage and actuate the roller arm 210 of the limit switch LS—2 to hold it closed each time the carriage is fully retracted from the work to allow indexing of the turret. This permits energizing the forward feed solenoid 195 of control valve 196 to begin the feeding operations toward the work piece W.

Limit switch LS—5 is a normally open switch and is located, Figures III and XX, on the bracket 52 and has its roller lever 211 so positioned as to be engaged by a dog pin 212 fixed in bracket 55 so that when the cylinder 51 has been actuated to bring the tools fully forward against the work and at the end of the cutting operation this switch LS—5 will be closed. Closing this switch starts a timing relay which energizes the rapid traverse reverse solenoid 213 of control valve 196 at the end of the predetermined timing period to return the tools from the work W.

*Operating cycle*

After the work or axle housing W has been properly chucked up in the center drive chuck 6 and adjusted in the steady rests 7 and 8 the push button station 198 is operated to start the main drive motor 16 in operation to rotate the center drive chuck. In this particular illustrative set-up the dog 185 is so arranged as to actuate limit switch LS—1 for operating valve 191 to cause fast spindle rotation during the first two operations and slow spindle rotating during the last two operations.

The feed control lever 197 of valve 196 is then moved to forward rapid traverse position causing the carriages to feed rapidly toward the work W. During this movement, Figure XX, fluid pressure from pump 46 passes through lines 192, 193, 214, control valve 196, and line 215 into the upper end of cylinder 51 forcing the piston 49 downward and likewise the rack 54 which in turn rotates the screw 61 to move the carriages 11 and 12. Fluid escapes freely from the lower chamber of cylinder 51 through lines 216, and 217, and through the feed and rapid traverse selector valve 204, which has a plunger 218 which normally projects outwardly to allow such free flow for rapid traverse forward movements, and then through lines 219 and 220 to valve 196 from which the expelled fluid returns by a suitable drain line to fluid reservoir for the hydraulic system.

As soon as the carriages have rapidly traveled their tools up closely to the work a dog 221 mounted on the rear of the carriage 11 engages the plunger 218 of feed and rapid traverse selector valve 204 shutting off the free flow of fluid from line 217 to line 219. Fluid exhausting through line 216 is thus forced to pass through line 222, the feed rate control valve 223 and line 224 into line 220. This valve 223 greatly restricts the escape of fluid from the lower chamber of cylinder 51 and causes the piston 49 to move slowly downward to produce feeding movements of the carriages to the work. This valve 223 may be regulated by manipulating the hand lever 225, Figure XIII. The rate of feed for each operation is also automatically controlled by the pointed dogs 226 adjustably threaded in the drum 179 which engage the feed rate control plunger 227 of the control valve 223. A dog 226 is provided for each position of the turret and are independently adjustable for obtaining any predetermined rate of feed for each operation to be performed.

Upon the completion of the forward feeding of the tools into the work the limit switch LS—5 is actuated which actuates a time delay relay, and, after a predetermined interval necessary to dwell the tools for cleaning up the work, solenoid 213 of control valve 196 is actuated to move the valve to rapid traverse return position. When valve 196 is so operated fluid pressure from pump 46 passes through line 192, 193, and 214, valve 196, lines 220, and 219, valve 204, which is designed to permit free flow of fluid at all times from lines 219 to 217, lines 217 and 216 to the lower chamber of the cylinder 51 raising the piston rapidly to return the carriages away from the work, the exhausted fluid from the upper chamber of the cylinder 51 passing through line 215 to valve 196 and thence to a drain line into the fluid reservoir.

The rapid return movement of the carriage causes the turrets to index to operation two position as described and at the end of this return movement dog pin 209 actuates limit switch LS—2 to energize solenoid 195 of control valve 196 to again set it for rapid traverse forward movement of the carriages and the beginning of another feeding cycle of the carriage as described.

This feeding cycle is duplicated for operations three and four. However, during these last two feeding operations dog 185 releases the limit switch LS—1 to cause the valve 191 to operate the clutch 34 for slow speed operation of the center drive chuck. Also upon the return of the carriages at the completion of the fourth operation limit switch LS—2 is rendered ineffective by the actuation of limit switch LS—3 by dog 186 so that the valve 196 remains in rapid traverse return position thus bringing the carriage feeding to a stop. Limit switch LS—4 is likewise contacted at this time by dog 187 to bring the main drive motor 16 to a stop. The lathe is then ready for the insertion of a new piece of work.

Having fully set forth and described our invention what we claim is:

1. In a lathe, a bed, means on said bed for chucking and rotating a work piece intermediate its ends, steady rests on the bed for supporting said work piece adjacent its ends, carriages movably mounted on said bed, tool feeding devices movably mounted on said steady rests, means for moving said carriages to and from the end portions, of said work piece, indexing turrets on said carriages, means for indexing said turrets for each reciprocation of said carriages, and mechanism associated with said turrets for actuating said tool feeding devices when said carriages are actuated.

2. In a lathe, a bed, means on said bed for chucking and rotating a work piece intermediate its ends, steady rests on the bed for supporting said work piece adjacent its ends, carriages movably mounted on said bed, tool feeding devices pivotally mounted on said steady rests, means for moving said carriages to and from the end portions of said work piece, indexing turrets on said carriages, means for indexing said turrets for each reciprocation of said carriages, and cam mechanism associated with said turrets for swinging said tool feeding devices to and from said work piece at one or more indexed positions of said turrets.

3. In a lathe, a bed, means on said bed for chucking and rotating a work piece intermediate its ends, steady rests on the bed for supporting said work piece adjacent its ends, carriages movably mounted on said bed, means for moving said carriages relative to said work piece comprising a right and left hand screw operating in nut boxes carried by said carriages, and hydraulically actuated rack and pinion mechanism for rotating said screw, tool feeding devices movably mounted on said steady rests, means for moving said carriages to and from the end portions of said work piece, indexing turrets on said carriages, means for indexing said turrets for each reciprocation of said carriages, and mechanism associated with said turrets for actuating said tool feeding devices when said carriages are actuated.

4. In a lathe, a bed, a rotatable work holder mounted on said bed, an electric motor for driving said work holder, a change speed transmission connecting said motor with said work holder, hydraulically operated means for effecting speed changes in said transmission, a source of fluid pressure for said hydraulically operated means, electrically operated control means for said source of fluid pressure, a carriage movable on said bed, an indexing turret on said carriage, a limit switch inter-connected with said electrically operated control means, and means for actuating said limit switch upon indexing of said turret so that a predetermined speed of rotation of said work holder may be obtained for each indexed position of said turret.

5. In a lathe, a bed, a rotatable work holder mounted on said bed, an electric motor for driving said work holder, a change speed transmission connecting said motor with said work holder, a limit switch for stopping said electric motor when actuated, hydraulically operated means for effecting speed changes in said transmission, a source of fluid pressure for said hydraulically operated means, electrically operated control means for said source of fluid pressure, a carriage movable on said bed, an indexing turret on said carriage, a limit switch inter-connected with said electrically operated control means, and means for actuating both of said limit switches upon indexing of said turret so that a predetermined speed of rotation of said work holder may be automatically obtained for each indexed position of said turret and said work holder rotation may be automatically stopped at one of said indexed positions.

6. In a lathe, a bed, a carriage movable on said bed, an indexing turret mounted on said carriage, hydraulic motive means for reciprocating said carriage, a source of fluid pressure, electrically operated control means between said hydraulic motive means and said source of fluid pressure for reversing the direction of movement of said carriage, means operated by the movement of said carriage for rendering said control means effective at the end of each movement of said carriage, and means operated by the indexing of said turret to render said control means ineffective.

7. In a lathe, a bed, a carriage movable on said bed, hydraulic motive means for reciprocating said carriage, a source of fluid pressure, electrically operated control means between said hydraulic motive means and said source of fluid pressure for reversing the direction of movement of said carriage, a limit switch actuated by the movement of said carriage to cause said control means to effect movement of the carriage in one direction, and a limit switch actuated by movement of said hydraulic motive means to effect movement of the carriage in the other direction.

8. In a lathe, a bed, a carriage movable on said bed, an indexing turret mounted on said carriage, hydraulic motive means for reciprocating said carriage, a source of fluid pressure, electrically operated control means between said hydraulic motive means and said source of fluid pressure for reversing the direction of movement of said carriage, a limit switch actuated by the movement of said carriage to cause said control means to effect movement of the carriage in one direction, a limit switch actuated by movement of said hydraulic motive means to effect movement of the carriage in the other direction, and a limit switch actuated by the indexing of said turret to render said control means inoperative.

9. In a lathe, a bed, a carriage movable on said bed, hydraulic motive means for reciprocating said carriage, a source of fluid pressure, electrically operated control means between said hydraulic motive means and said source of fluid pressure for reversing the direction of movement of said carriage, means operated by the movement of said carriage for rendering said control means effective at the end of each movement of said carriage, and further control means associated with said first mentioned control means and operated by the movement of said carriage to effect a change in the rate of movement of said carriage.

10. In a lathe, a bed, a carriage movable on said bed, an indexing turret on said carriage, hydraulic motive means for reciprocating said carriage, a source of fluid pressure, electrically operated control means between said hydraulic motive means and said source of fluid pressure for reversing the direction of movement of said carriage for rendering said control means effective at the end of each movement of said carriage, and further control means associated with said first mentioned control means and operated by the indexing of said turret to effect a predetermined rate of movement of the carriage for each indexed position of said turret.

11. In a lathe, a bed, means on said bed for supporting and rotating a work piece intermediate its ends, steady rests on said bed each side of said means, facing tools located each side of said means and steady rests and adjacent said steady rests, carriages movable on said bed each side of said means and steady rests, indexing turrets on said carriages, means for simultaneously moving said carriages to and from said means and said steady rests, means located at some positions on said turrets for actuating said facing tools when said carriages are moved, and means for indexing said turrets.

WILLIAM F. GROENE.
HAROLD J. SIEKMANN.